UNITED STATES PATENT OFFICE.

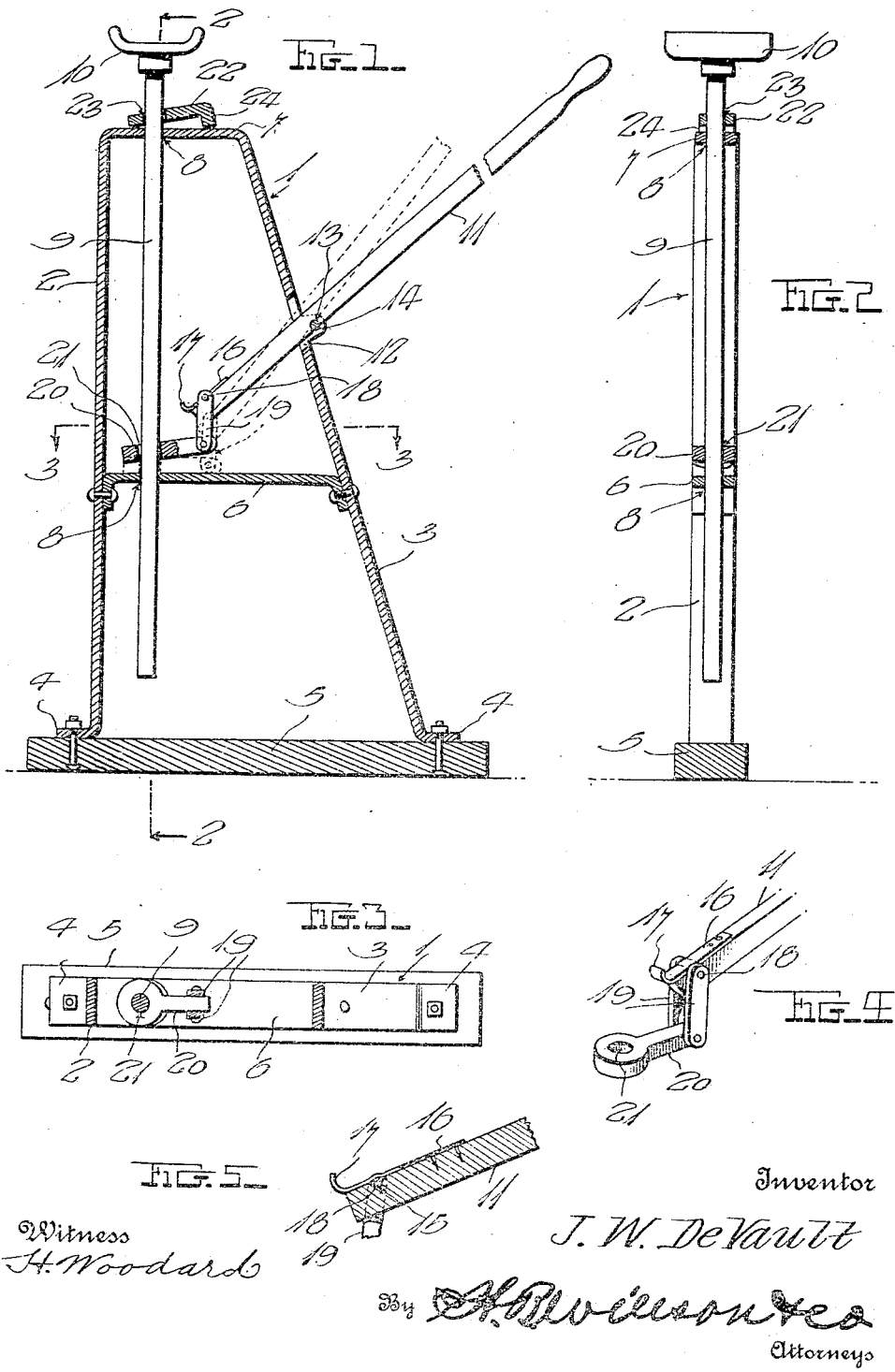

JAMES W. DE VAULT, OF SAVANNAH, GEORGIA.

JACK.

1,288,390. Specification of Letters Patent. Patented Dec. 17, 1918.

Application filed May 16, 1918. Serial No. 234,990.

*To all whom it may concern:*

Be it known that I, JAMES W. DE VAULT, a citizen of the United States, residing at Savannah, in the county of Chatham and State of Georgia, have invented certain new and useful Improvements in Jacks; and I do declare the following to be a full, clear, and exact description of the invention, such as will enable others skilled in the art to which it appertains to make and use the same.

My invention has for its object to provide a simple and inexpensive, yet an efficient and durable jack for vehicles and in fact for raising any load, provision being made whereby ratchets and the like are eliminated.

With this object in view, the invention resides in the novel structure herein described, shown and claimed.

In the drawing:

Figure 1 is a vertical section of the jack;

Fig. 2 is a section on line 2—2 of Fig. 1;

Fig. 3 is a horizontal section on line 3—3 of Fig. 1;

Fig. 4 is a detail perspective of the connection between the lifting lever and the lifting dog; and Fig. 5 is a detail section of the connection seen in Fig. 4.

In the drawing above briefly described, the numeral 1 designates an arch formed of a single metal bar, said arch having a vertical leg 2 and an inclined leg 3, the lower ends of said legs being bent outwardly to form feet 4 secured to a base 5. A horizontal guide bar 6 extends between and is secured to the legs 2 and 3, said bar and the crown 7 of the arch 1 having alined openings 8 near the leg 2 in which openings, a smooth jack shank 9 slides, the upper end of said shank having a rest 10.

A lifting lever 11 passes through a slot 12 in leg 3 and is provided with a notch 13 receiving a pin 14 carried by said leg to form a fulcrum for the lever. On its upper edge, the front end of lever 11 is provided with a notch 15 over which a flat spring 16 extends, the rear end of said spring being secured to the lever while its front end is bent upwardly at 17. A pin 18 carried by links 19 is received normally in notch 15 and is held removably therein by spring 16, said links rising from a lifting dog 20 in the form of a plate having an opening 21 receiving the shank 9. By the provision of the spring 16 and the notches 15 and 13, the lever 11 may be easily removed when required.

A holding dog 22 in the form of a plate is provided at one end with an opening 23 through which shank 9 passes, the other end of said dog being bent downwardly at 24 for contact with the crown 7.

By the arrangement shown and described, a downward push on lever 11 will cant dog 20 and cause it to grip and raise the shank 9, the latter then sliding through the opening 23 of dog 22. The moment the pressure on lever 11 is discontinued, the load slightly depresses the shank 9 and causes the dog 22 to come into play to hold said shank against further movement until lever 11 is again actuated to either raise the shank farther or to lower the same.

When lowering, the dog 22 is turned to move its lug 24 off of the crown 7 thus releasing said dog, the lever 11 may then be actuated to lower the load. By permitting dog 20 to rest flat on the bar 6 it is released and thus the load may be lowered suddenly if required.

From the foregoing, it will be seen that although the device is simple and inexpensive, it will be efficient and reliable. Since probably the best results are obtained from the arrangement shown and described, it is preferably followed, but minor changes may well be made.

I claim:

A jack comprising a base, an arch formed of a single bar, said arch having a vertical leg and an inclined leg whose lower ends are bent laterally and secured to said base, a cross bar extending between and secured to said legs, said bar and the crown of the arch having openings, a jack shank slidable through said openings near said vertical leg, lifting and holding dogs above said cross bar and crown respectively and each formed of a plate having an opening receiving said shank, one end of said holding dog being directed downwardly to rest on said crown, a pair of links rising from one end of said lifting dog, and carrying a transverse pin, a lifting lever having in the upper edge of its front end a notch receiving said pin, and a flat spring secured to said lever and extending over said notch and pin, the inclined leg of the arch having a slot through which said lever extends and a fixed pin at said slot, the lower edge of said lever having a notch receiving said last named pin.

In testimony whereof I have hereunto set my hand.

JAMES W. DE VAULT.

Witnesses:
J. H. LAUGHLIN,
F. L. ROUSE.